US010687918B2

(12) United States Patent
Paehl et al.

(10) Patent No.: US 10,687,918 B2
(45) Date of Patent: Jun. 23, 2020

(54) METHOD OF PREPARING AN ORTHODONTIC BRACKET

(71) Applicant: 3M INNOVATIVE PROPERTIES COMPANY, St. Paul, MN (US)

(72) Inventors: Ralf M. Paehl, Melle (DE); Thomas Weise, Bremen (DE)

(73) Assignee: 3M Innovative Properties Company, St. Paul, MN (US)

( * ) Notice: Subject to any disclaimer, the term of this patent is extended or adjusted under 35 U.S.C. 154(b) by 611 days.

(21) Appl. No.: 15/316,464

(22) PCT Filed: Jun. 4, 2015

(86) PCT No.: PCT/US2015/034227
§ 371 (c)(1),
(2) Date: Dec. 5, 2016

(87) PCT Pub. No.: WO2015/187967
PCT Pub. Date: Dec. 10, 2015

(65) Prior Publication Data
US 2017/0209241 A1    Jul. 27, 2017

(30) Foreign Application Priority Data

Jun. 6, 2014  (EP) ..................................... 14171442

(51) Int. Cl.
*A61C 7/16*    (2006.01)
*A61C 7/14*    (2006.01)
(Continued)

(52) U.S. Cl.
CPC ................... *A61C 7/16* (2013.01); *A61C 7/14* (2013.01); *A61C 7/145* (2013.01); *B22C 7/02* (2013.01); *B22D 25/02* (2013.01); *A61C 13/0022* (2013.01)

(58) Field of Classification Search
CPC .. A61C 7/16; A61C 7/145; A61C 7/14; A61C 13/0022; B22C 7/02; B22D 25/02
(Continued)

(56) References Cited

U.S. PATENT DOCUMENTS 2,905,064 A * 9/1959 Nielsen .................. B23P 25/00
269/7
3,707,152 A * 12/1972 Arnold .................. A61C 7/282
164/45
(Continued)

FOREIGN PATENT DOCUMENTS

| DE | 102006034551 | 1/2008 |
| WO | WO 98/36871 | 8/1998 |
| WO | WO 2012/087997 | 6/2012 |

OTHER PUBLICATIONS

International Search Report for PCT International Application No. PCT/US2015/034227, dated Oct. 5, 2015, 4 pages.

*Primary Examiner* — Matthew M Nelson
(74) *Attorney, Agent, or Firm* — Kevin Weber (57) ABSTRACT

A method of preparing an orthodontic bracket. Such an orthodontic bracket has a bracket bonding pad and a bracket body with a bracket slot. The method has steps of providing a precursor of an orthodontic bracket into a machine for modifying the shape of the orthodontic bracket precursor. The orthodontic bracket precursor has an alignment structure of a pre-determined geometry. Further the alignment structure and the bracket slot are spatially arranged relative to each other at a pre-determined distance and orientation. The method further has the steps of aligning the orthodontic bracket precursor based on the alignment structure and embedding the orthodontic bracket precursor at least partially in a liquid. The liquid is cause to solidify and thereby the orthodontic bracket precursor is retained in position. The so retained orthodontic bracket precursor is changed in shape. The invention helps finishing pre-finished individually shaped orthodontic bracket precursors in a relatively accurate and controlled manner.

11 Claims, 4 Drawing Sheets

(51) Int. Cl.
*B22C 7/02* (2006.01)
*B22D 25/02* (2006.01)
*A61C 13/00* (2006.01)

(58) Field of Classification Search
USPC .............................................. 433/9
See application file for complete search history.

(56) References Cited

U.S. PATENT DOCUMENTS

| | | |
|---|---|---|
| 6,513,316 B1 | 2/2003 | Passaro |
| 2002/0125619 A1* | 9/2002 | Bodenmiller ...... A61C 13/0003 264/678 |
| 2002/0137002 A1* | 9/2002 | Bodenmiller ...... A61C 13/0004 433/51 |
| 2003/0031977 A1* | 2/2003 | Bodenmiller ...... A61C 13/0003 433/49 |
| 2003/0041992 A1* | 3/2003 | Fee ..................... B22C 7/02 164/35 |
| 2003/0152884 A1 | 8/2003 | Wiechmann et al. |
| 2011/0207072 A1 | 8/2011 | Schiemann |
| 2012/0015315 A1 | 1/2012 | Wiechmann et al. |
| 2013/0316296 A1* | 11/2013 | Vu ..................... A61C 7/146 433/9 |
| 2014/0250689 A1* | 9/2014 | Miquel .............. A61C 13/0006 29/896.1 |

\* cited by examiner

METHOD OF PREPARING AN ORTHODONTIC BRACKET

CROSS REFERENCE TO RELATED APPLICATIONS

This application is a national stage filing under 35 U.S.C. 371 of PCT/US2015/034227, filed Jun. 4, 2015 which claims the benefit of European Application No. 14171442.8, filed Jun. 6, 2014, the disclosure of which is incorporated by reference in its/their entirety herein.

FIELD OF THE INVENTION

The invention relates to method of preparing an orthodontic bracket having a bracket bonding pad and a bracket body with a bracket slot. In particular the method provides for retaining differently shaped precursors of patient-individual brackets within a solidified liquid. Further the invention relates to a set of orthodontic bracket precursors and a device for preparing an orthodontic bracket.

BACKGROUND ART

Orthodontic brackets are generally used in orthodontic treatments for moving one or more teeth from an initial position to a desired position in a patient's dentition. The initial position typically refers to a position at the beginning of an orthodontic treatment, for example a position in which the labial faces of the teeth are misaligned to each other, whereas in the desired position the labial faces of the same teeth may be generally aligned. For example the patient's teeth may be aligned relative to each other to provide the dentition with a more aesthetically pleasant appearance. Further one or more teeth may be moved within the dentition to compensate for a malocclusion. Such a movement of a tooth or teeth can be typically achieved by using one or more brackets attached to one or more teeth. The brackets are typically connected to an elastic archwire for applying forces to the teeth urging them toward desired positions over a longer term.

Often orthodontic brackets are off-the-shelf products which are configured for use with clinical situations of different patients. Further there are customized orthodontic brackets which are typically made to fit with an individual clinical situation of one particular patient.

For example US 2012/0015315 A1 discloses a customized orthodontic bracket system which includes a bracket having a customized bracket bonding pad for bonding the bracket to a tooth of a patient and a bracket slot adapted to receive a customized archwire. The customized archwire is adapted to be positioned in the bracket slot to form a precise bracket slot-archwire interface.

Although a variety of different brackets and bracket systems are on the market there is still a desire to provide brackets which on the one hand match an individual clinical situation and on the other hand are minimized in costs for manufacturing and costs for application to a patient's teeth. Typically the minimization of costs in the manufacturing must be balanced relative to the desired accuracy of the customized brackets. For example, brackets should be placeable easily and precisely to a patients teeth, and should have a geometry allowing an orthodontic archwire to be attached or slidably coupled precisely at desired positions relative to the teeth. Further customized brackets should be sufficiently durable over the time period of an orthodontic treatment. On the other hand available manufacturing methods for mass production of customized brackets may not be compatible with such precision and quality requirements, whereas available sufficiently precise and high quality manufacturing methods may not satisfy or fully satisfy requirements for mass production at commercially viable costs.

SUMMARY OF THE INVENTION

The invention relates to a method of preparing an orthodontic bracket. The orthodontic bracket concerned has a bracket bonding pad and a bracket body. The bracket body has or forms a bracket slot.

The method comprises the steps of:
- providing a precursor of an orthodontic bracket into a machine for modifying the shape of the orthodontic bracket precursor, wherein the orthodontic bracket precursor has an alignment structure of a pre-determined geometry, wherein the alignment structure and the (intended) bracket slot are spatially arranged relative to each other at a pre-determined distance and orientation;
- aligning the orthodontic bracket precursor based on the alignment structure;
- embedding the orthodontic bracket precursor at least partially in a liquid;
- causing the liquid to solidify and thereby retaining the orthodontic bracket precursor in position; and
- changing the shape of the orthodontic bracket precursor retained in the solidified liquid.

The invention is advantageous in that it allows a serial production of a part of a multiplicity of orthodontic brackets while another part of these orthodontic brackets can be customized to individual teeth of patients. Further the invention allows manufacturing of a bracket slot within the bracket body at a maximized accuracy to provide a precise and durable fit between the bracket body and an archwire to be received within the bracket slot, whereas the accuracy of the overall orthodontic bracket shape can be adapted to the needs of an individual clinical situation of a patient. The invention is further advantageous in that it helps minimizing costs in the manufacturing.

In one embodiment the orthodontic bracket precursor comprises the bracket pad and the alignment structure. The orthodontic bracket precursor may not have a bracket slot or may have a precursor of the final bracket slot, for example a bracket slot which is undersized with respect to the final bracket slot. Nevertheless the spatial arrangement (distance and orientation) between the alignment structure and the bracket slot is predetermined even at a stage in with the bracket slot is not present or not completed in the orthodontic bracket precursor. Such a pre-determination may for example be specified in a construction plan or a computer model of the orthodontic bracket precursor.

In embodiments of the method in which the orthodontic bracket is obtained from the orthodontic bracket precursor by material removal only, the orthodontic bracket precursor preferably has the bracket body connected to the bracket pad. The orthodontic bracket precursor may have one or more wings and/or hooks arranged at the bracket body. However in another embodiment the orthodontic bracket precursor may not have the bracket body, but the bracket body may be built up on the bracket pad by the method of the invention. In the latter embodiment the bracket slot may be built together with building up the bracket body, or the bracket slot may be cut into the bracket body that was previously built up. Generally the alignment structure is preferably not part of the final orthodontic bracket, and therefore may be referred to as a "lost alignment structure" with respect to the final orthodontic bracket.

In one embodiment the machine for modifying the shape of the orthodontic bracket precursor is adapted for machining based on material removal. The machine for modifying the shape of the orthodontic bracket precursor may comprise a grinding or milling device. The machine for modifying the shape of the orthodontic bracket precursor may further comprise a device for EDM (Electric Discharge Machining). In one embodiment the machine for modifying the shape of the orthodontic bracket precursor comprises a build-up device, in particular a SLM (Selective Laser Melting) device. Further the machine for modifying the shape of the orthodontic bracket precursor may comprise a device for metal forming.

In one embodiment the method further comprises the step of cooling the liquid to cause the liquid to freeze. Thus the liquid is caused to solidify. In this regard the term "cooling" encompasses both, (a) allowing the temperature of the liquid to reduce from a temperature above room temperature toward room temperature, and (b) causing the temperature of the liquid to reduce from room temperature toward a temperature below room temperature, where room temperature is considered about 23° C. for the purpose of the present specification. For example the liquid may be received in a tray and the tray may be placed on a cooled surface or within a cooled chamber for causing the liquid to freeze. The tray may further be configured to cool the liquid therein. For example the tray may comprise a pipe and/or a channel for guiding a coolant therethrough. The liquid may comprise or may essentially consist of water. The skilled person will recognize other materials, for example materials that are solid at room temperature and can be melted at low temperatures above room temperature, like for example metals like indium bismuth tin alloys.

In one embodiment the method further comprises the step of providing a plurality of differently shaped orthodontic bracket precursors with essentially identically shaped alignment structures. For example the plurality of differently shaped orthodontic bracket precursors may be precursors belonging to a set of brackets which are individualized to a patient's dentition or a patient's teeth. Each orthodontic bracket precursor of such a set of orthodontic bracket precursors preferably has a bracket pad which is shaped to conform to one particular tooth of that patient.

In one embodiment the method further comprises the steps of:
 providing a die having essentially the same shape as the orthodontic bracket precursor and being formed of a polymeric material or wax;
 providing a mold from embedding the die in a hardenable heat resistant material; and
 casting the orthodontic bracket precursor based on a lost wax casting technique.

In this regard the term "essentially the same shape" encompasses a slight three-dimensional oversize to account for shrinkage occurring during molding the orthodontic bracket precursor.

In one embodiment the step of casting the orthodontic bracket precursor is based on casting a molten metal. Accordingly the orthodontic bracket precursor is preferably casted from a metal, in particular from cobalt-chrome steel, gold or any other metal as appropriate. The hardenable heat resistant material for providing the mold may be a plaster or another suitable hardenable material.

In one embodiment the alignment structure is formed by a mold portion of the mold that is located adjacent the mold gate. In other words the mold runner, which is the mold portion for guiding the melted material from the mold gate to the actual part to be molded, may be shaped according to the negative shape of the alignment structure. After removal of the orthodontic bracket precursor from the mold the material residing in the mold runner also forms the alignment structure. Thus the mold runner is provided with a double function, firstly that of the mold runner and, secondly, that of a mold portion to form or shape the alignment structure. The skilled person will recognize that likewise the alignment structure may be molded by a mold portion other than the runner even if this option is less preferred for the purpose of this specification.

In a further embodiment the method further comprises the step of removing the alignment structure and thereby changing the shape of the orthodontic bracket precursor. The method preferably further comprises the step of creating or finishing the bracket slot and thereby changing the shape of the orthodontic bracket precursor. In one embodiment by the combination of removing the alignment structure and creating or finishing the bracket slot the orthodontic bracket is provided.

The orthodontic bracket is preferably a patient-individual lingual orthodontic bracket, but may in another embodiment be a patient-individual labial orthodontic bracket.

In one embodiment the step of creating or finishing the bracket slot also separates the alignment structure from the remainder of the orthodontic bracket precursor. In this embodiment the alignment structure is connected to that portion of the orthodontic bracket precursor that is to be removed to create the bracket slot.

In a further aspect the invention relates to a set of orthodontic bracket precursors. Each of the orthodontic bracket precursors comprises a bracket bonding pad, a bracket body and an alignment structure. The bracket body comprises a bracket slot. The alignment structures of the set of orthodontic bracket precursors have essentially the identical geometry. Further, the alignment structure and the bracket slot of each orthodontic bracket precursor are spatially arranged relative to each other at substantially the same pre-determined distance and orientation. As described above the bracket body may in one embodiment be optional, for example if the bracket body is created by a build-up procedure.

The invention relates in a further aspect to a device for preparing an orthodontic bracket. The orthodontic bracket concerned has a bracket bonding pad and a bracket body with a bracket slot. The device comprises:
 an infeed for receiving an orthodontic bracket precursor having an alignment structure of a pre-determined geometry, wherein the alignment structure and the bracket slot are spatially arranged relative to each other at a pre-determined distance and orientation;
 a detector for recognizing the alignment structure;
 a receptacle for receiving a liquid;
 means for aligning the orthodontic bracket precursor at least partially within the receptacle based on the alignment structure;
 a cooling unit for cooling a liquid received in the receptacle so as to solidify the liquid and thereby to retain the orthodontic bracket precursor within the solidified liquid; and
 a device for changing the shape of the orthodontic bracket precursor retained in the solidified liquid.

The detector may comprise a camera system for recognizing the shape, position and orientation of each orthodontic bracket precursor. Based on this information a pick and place system may pick an orthodontic bracket precursor and place it into a free receptacle of an alignment device. The alignment device is preferably adapted to receive several orthodontic bracket precursors, for example with the alignment structures aligned in a row along a straight line. Thus the intended bracket slot is also aligned in a row along a straight line because the alignment structure and the bracket slot are spatially arranged relative to each other at one common pre-determined distance and orientation.

The alignment device may be positioned at a known or pre-determined position relative to a tray for holding the hardenable liquid. The orthodontic bracket precursor(s) are preferably positioned at least partially into the liquid, for example such that the portion of the orthodontic bracket precursor(s) obtaining the bracket slot are covered by the liquid. Once the liquid is solidified those portions of the orthodontic bracket precursor(s) that are covered by the liquid are captured and supported by the solidified liquid.

The orthodontic bracket precursor(s) captured in the solidified liquid may be finished by creating or finishing the bracket slot, for example by grinding or milling.

The invention in a further aspect (not claimed) relates to a method for preparing an orthodontic bracket. The orthodontic bracket concerned has a bracket bonding pad and a bracket body with a bracket slot. The method comprises the steps of:
- capturing at least a portion of an orthodontic bracket precursor having at least the bracket bonding pad and optionally the bracket body, but no bracket slot or an undersized precursor of the bracket slot;
- aligning the orthodontic bracket precursor based on the portion of the orthodontic bracket precursor;
- embedding the orthodontic bracket precursor at least partially in a liquid;
- causing the liquid to solidify and thereby retaining the orthodontic bracket precursor in position; and
- changing the shape of the orthodontic bracket precursor retained in the solidified liquid.

The orthodontic bracket precursor may be captured by a camera and a computer may determine the position and orientation of the orthodontic bracket precursor based on a computer model of the orthodontic bracket precursor in comparison to the captured orthodontic bracket precursor. The model of the orthodontic bracket precursor may be stored on the computer and may comprise the shape, position and orientation of the bracket slot. A pick and place system may position the orthodontic bracket precursor in the liquid to a determined position such that in a subsequent step the bracket slot can be machined, for example milled or ground, in the orthodontic bracket precursor to the desired position according the information provided by the model of the orthodontic bracket precursor.

DETAILED DESCRIPTION OF THE INVENTION

Figure 1:
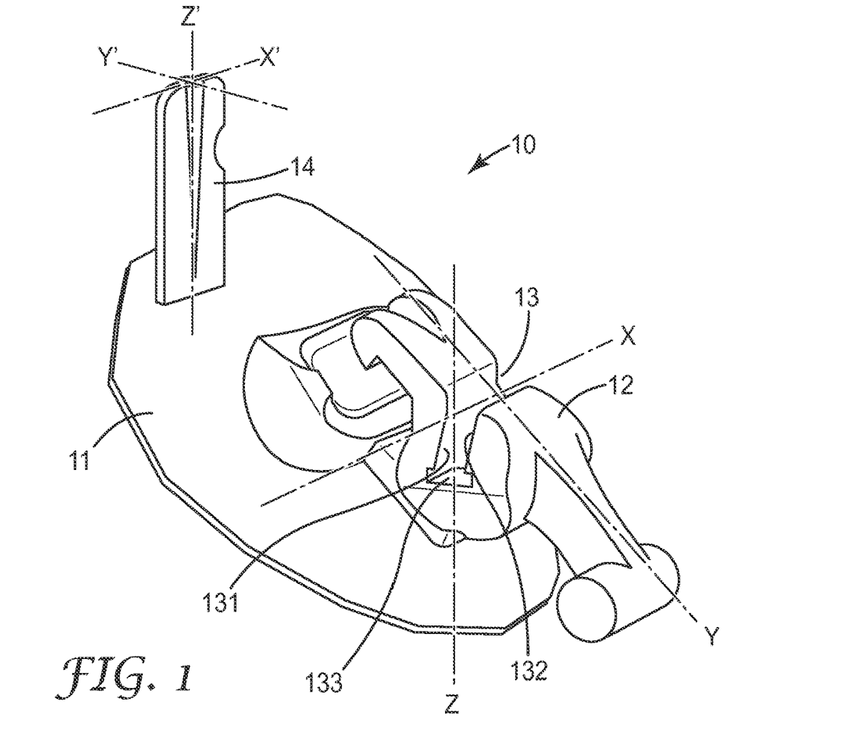
FIG. 1 is a perspective view of an orthodontic bracket precursor obtainable by a method according to an embodiment of the invention.

FIG. 1 shows an orthodontic bracket precursor 10, which has a bracket bonding pad 11 and a bracket body 12. In the example orthodontic bracket precursor 10 is customized for use on the lingual side of a particular tooth of a patient. This means that the bracket bonding pad 11 at its tooth facing side is configured to substantially conform to a portion of the patient's tooth surface, and that the bracket body 12 and the bracket slot (not illustrated at its final stage) are configured to connect with a patient specific archwire. A method of making customized orthodontic brackets is known in the art and is for example disclosed in EP 1 474 064 B1.

The bracket body 12 in the example forms a pre-finished bracket slot 13. The pre-finished bracket slot 13 is undersized relative to the finished bracket slot at its final stage. This allows the orthodontic bracket precursor 10 to be pre-manufactured using a first manufacturing method and finishing the bracket slot using a different second manufacturing method. The second manufacturing method may be selected for precisely finishing the bracket slot, while the first manufacturing method may allow creating of complex three-dimensional shapes. Examples for the first manufacturing method comprise casting or molding, stereolithography (SLA), selective laser melting (SLM), selective laser sintering (SLS), further build-up techniques like powder layering, assembly from two or more pre-finished components, by metal forming, or a combination thereof.

In the example the finished bracket slot is intended to extend through the bracket body 13 along an X axis. The bracket slot is formed by two opposing generally planar bracket slot flanks 131, 132 and a generally planar bracket slot bottom 133 with the bracket slot flanks 131, 132 being arranged generally parallel to each other and with the bracket slot bottom 133 extending generally perpendicular to the bracket slot flanks 131, 132. Accordingly the bracket slot flanks 131, 132 extend in two dimensions substantially in a plane having a dimension parallel to the X axis and a further dimension parallel to a Z axis transverse to the X axis. Further the bracket slot bottom 133 extends in two dimensions substantially in a plane having a dimension parallel to the X axis and a further dimension a parallel to a Y axis perpendicular to the X and Z axis. The spatial arrangement of the bracket slot is thus determined within a first three-dimensional coordinate system defined by the X, Y and Z axis.

The orthodontic bracket precursor 10 further has an alignment structure 14. The alignment structure 14 has a pre-determined geometry and is spatially arranged at a pre-determined distance and orientation relative to the bracket slot. In the example the alignment structure extends at a generally rectangular cross-section from the bonding pad 11 along a Z' axis. Further the sides of the rectangular cross-section are parallel to an X' axis or Y' axis. The spatial arrangement of the alignment structure is thus determined within a second three-dimensional coordinate system defined by the X', Y' and Z' axis. The X', Y' and Z' axis in the example each extend parallel to the X, Y and Z axis, respectively, and therefore correspond to each other in orientation. Further in the example the X', Y' and Z' axis and the X, Y and Z axis, respectively, are offset relative to each other at a predetermined distance. Therefore the alignment structure 14 and the bracket slot are spatially arranged relative to each other at a pre-determined (spatial) distance and orientation. It is noted that the first and second coordinate system as referred to herein are used for the purpose of explanation. The skilled person will recognize the spatial arrangement between the alignment structure and the bracket slot may be determined in one common coordinate system. It is further noted that the spatial arrangement between the alignment structure and the bracket slot may be established by another pre-determined distance and/or orientation between the first and second coordinate system or in one common coordinate system.

Figure 2:
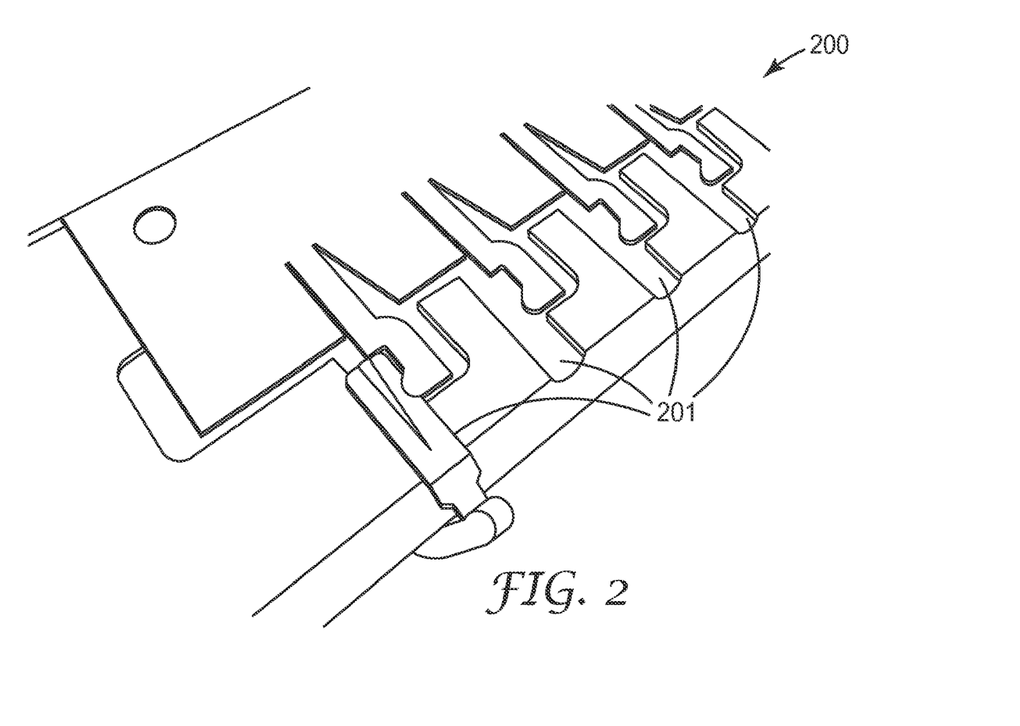
FIG. 2 is a perspective view of an alignment device for positioning a plurality orthodontic bracket precursor obtainable by a method according to an embodiment of the invention.

The alignment structure has an optional key 141 for locking the alignment structure 14 in an alignment device as one is shown in FIG. 2 by way of example only. The key 141 in the example is formed by a recess, but may in another example be formed of one or more recesses, protrusions and combinations thereof, as appropriate.

FIG. 2 shows an alignment device 200 having a plurality of receptacles 201 for receiving several substantially equally shaped alignment structures, for example of a set of orthodontic bracket precursors. The bonding pad and/or the bracket body of each orthodontic bracket precursor are typically individually shaped so that the orthodontic bracket precursors of the set of orthodontic bracket precursors differ in shape. However each of the orthodontic bracket precursors has an alignment structure of substantially the same geometry and therefore each of the orthodontic bracket precursors can be positioned in the alignment device 200 by receiving the alignment structures in the respective receptacles 201. The receptacles 201 are arranged parallel to each other and side by side along a straight line. Further due to the pre-determined spatial arrangement between the alignment structures and the respective slots, the positioning of the orthodontic bracket precursors in the alignment device 200 causes the orthodontic bracket precursors to be aligned with the slots in one straight line. It is noted that at an initial stage of positioning the orthodontic bracket precursors the slots may not be physically present or the slots may be undersized. The spatial arrangement of the bracket slot is however already pre-determined via the spatial arrangement of the alignment structure and a known distance and orientation between the spatial arrangement of the alignment structure and the spatial arrangement of the bracket slot relative to each other.

The set of brackets so received and aligned within the alignment device 200 may be finished by creating or finishing the bracket slot using low force material removal processes, like EDM (Electric Discharge Machining) and by removal of the alignment structures. In particular multiple, preferably all, slots of the set of brackets may be created or finished simultaneously, for example using wire-cut EDM with the wire running straight through multiple or all slots of the set of orthodontic bracket precursors. The same wire could be further used to cut off the alignment structure, although other techniques may be likewise used.

Further the alignment device 200 may be used for aligning the set of orthodontic bracket precursors in a row and retaining them in a solidified liquid as explained in the following.

Figures 3, 4:
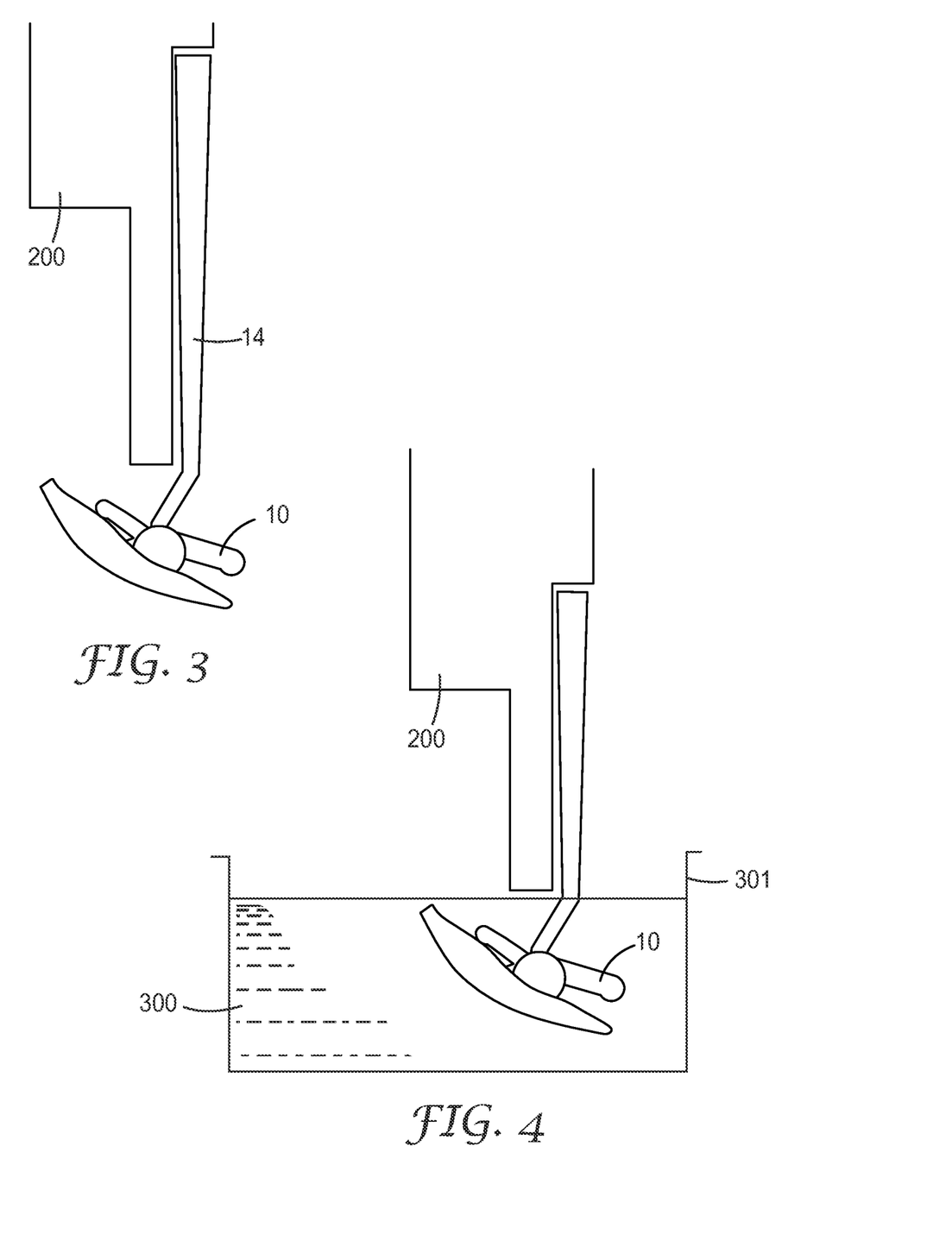
FIGS. 3-7 illustrate certain stages within a method according to an embodiment of the invention.

FIG. 3 shows an orthodontic bracket precursor 10 according to one embodiment of the invention. The orthodontic bracket precursor 10 is positioned in an alignment device 200 as for example described in FIG. 2. Therefore the orthodontic bracket precursor 10 is arranged with the spatial arrangement of the intended bracket slot being pre-determined or known. The orthodontic bracket precursor 10 in the example has an alignment structure 14 which merges with the bracket body 12 at a location at which the bracket slot is intended. This configuration provides for the alignment structure 14 to be separated along with creating the bracket slot into the orthodontic bracket precursor 10, as described in more detail below.

FIG. 4 shows the orthodontic bracket precursor 10 placed in a liquid 300, in the example water. The liquid 300 may be provided in a tray 301 which can be positioned and clamped in a machining device, for example a milling or grinding device. The orthodontic bracket precursor 10 is placed to a pre-determined position into the liquid by help the alignment device 200. Accordingly the orthodontic bracket precursor 10 is positioned within the tray 301 at a known position and orientation.

Figure 5:
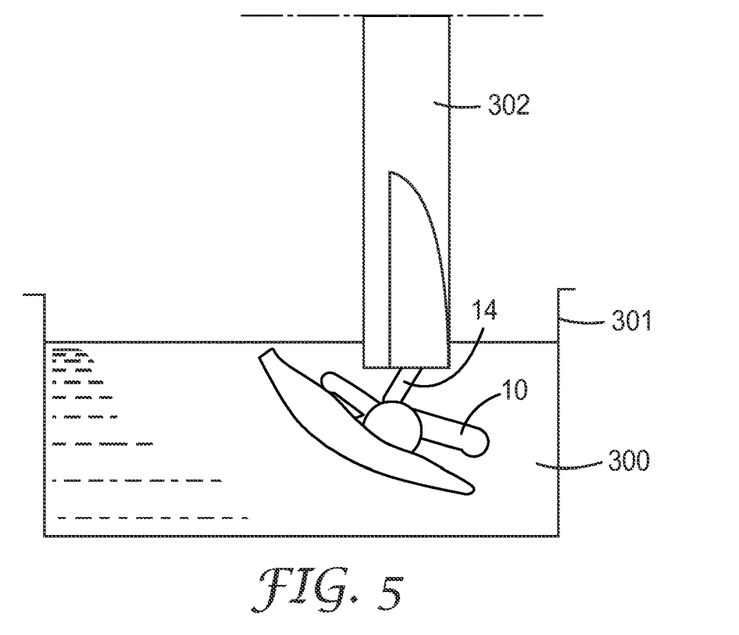

FIG. 5 shows the orthodontic bracket precursor 10 retained within the liquid 300 which now is solidified, in particular frozen. The tray 301 may be adapted for freezing the liquid therein. Alternatively the tray 301 may be placed in a separate cooling device for freezing the liquid 300. Thus the orthodontic bracket precursor 10 is retained within the solidified liquid 300 or within the tray 301 at a known position and orientation. It is noted that in the same manner a plurality of orthodontic bracket precursors can be retained in the solidified liquid with the intended slots arranged in a straight row.

A cutter 302, for example a milling tool, is used to cut off a portion of the alignment structure 14. The solidified liquid thereby holds the orthodontic bracket precursor 10 in position against any cutting forces.

Figure 6:
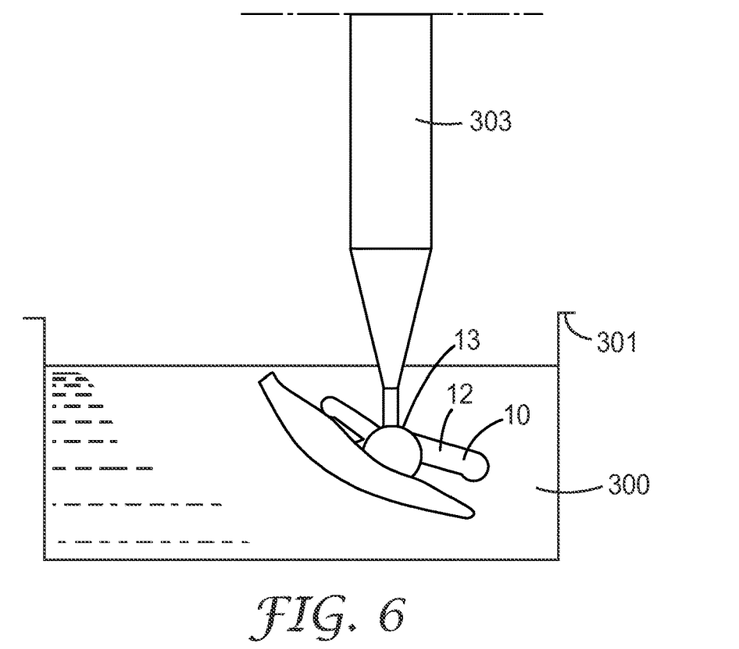

FIG. 6 shows the orthodontic bracket precursor 10 still retained within the solidified liquid 300. A cutter 303, for example a milling tool, is used to create or cut the bracket slot 13. Thereby the remaining portion of the alignment structure 14 is separated from the bracket body 12. In another example the bracket slot 13 may be created without prior cutting of a portion of the alignment structure.

Figure 7:
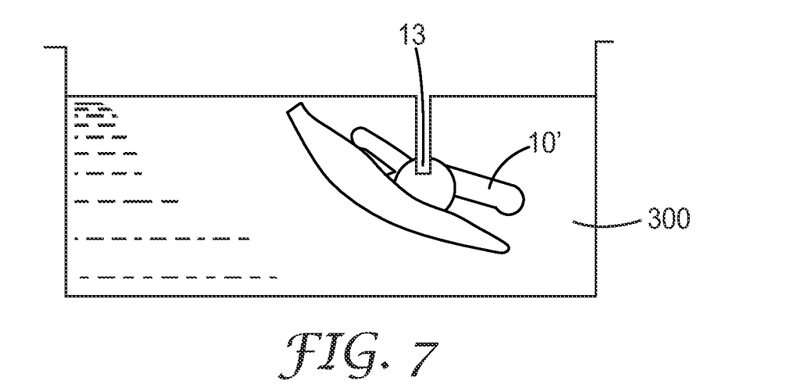

FIG. 7 shows the finished orthodontic bracket 10' with the bracket slot 13 in its final shape. The orthodontic bracket 10' is still retained within the solidified liquid 300. For removal of the orthodontic bracket 10' the liquid 300 can be softened, for example melted. The skilled person will recognize that the orthodontic bracket 10' may still be polished, coated, chamfered or otherwise refined prior to use for treating a patient.

Figure 8:
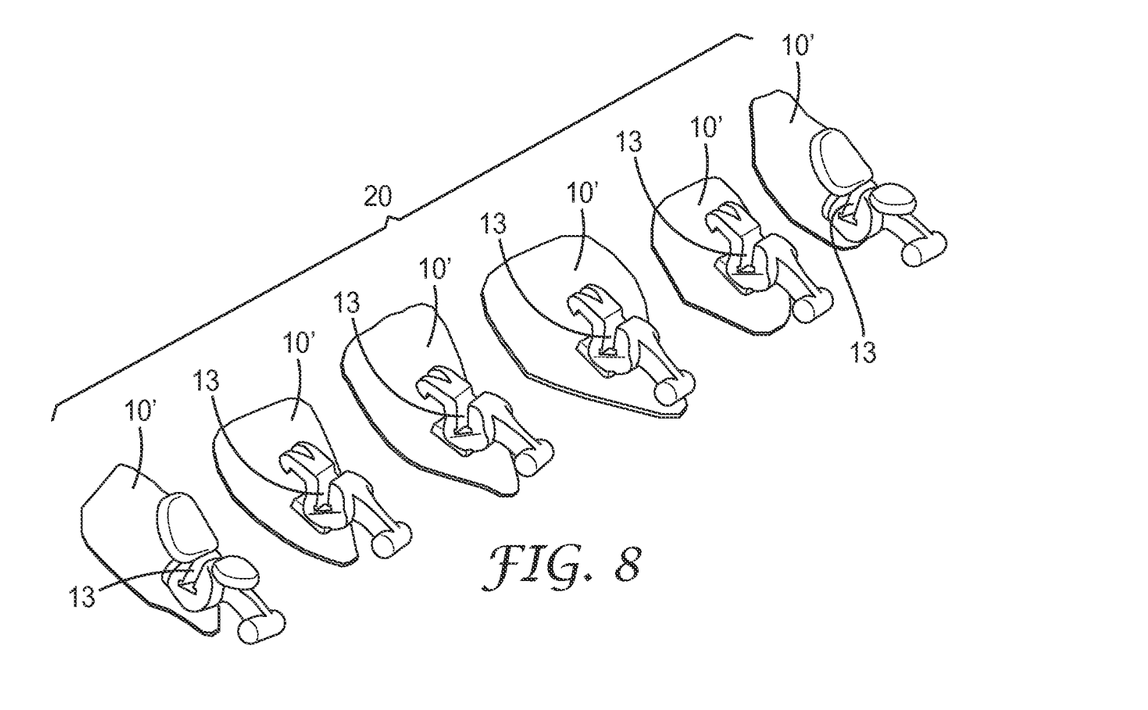
FIG. 8 shows a set of orthodontic bracket precursors obtainable by a method according to an embodiment of the invention.

FIG. 8 shows a set 20 of orthodontic brackets 10' as they can be obtained as described in FIGS. 3-7. The orthodontic brackets 10' each have an individual shape to match with a particular tooth surface of a patient. However the slots 13 are preferably precisely machined to a desired size and shape.

The invention claimed is:

1. A method of preparing an orthodontic bracket having a bracket bonding pad and a bracket body with a bracket slot, comprising the steps of:

providing a precursor of an orthodontic bracket into a machine for modifying the shape of the orthodontic bracket precursor, wherein the orthodontic bracket precursor has an alignment structure of a pre-determined geometry and a pre-finished bracket slot, wherein the alignment structure and the pre-finished bracket slot are spatially arranged relative to each other at a pre-determined distance and orientation, and wherein the pre-finished bracket slot is undersized relative to the bracket slot;

aligning the orthodontic bracket precursor based on the alignment structure;

embedding the orthodontic bracket precursor at least partially in a liquid;

causing the liquid to solidify and thereby retaining the orthodontic bracket precursor in position; and changing the shape of the orthodontic bracket precursor retained in the solidified liquid.

2. The method of claim 1, wherein the machine for modifying the shape of the orthodontic bracket precursor is adapted for machining based on material removal.

3. The method of claim 1, wherein the machine for modifying the shape of cooling the liquid to cause the liquid to freeze.

4. The method of claim 1, wherein the method further comprises the step of freezing the liquid.

5. The method of claim 4, wherein the liquid comprises or essentially consists of water.

6. The method of claim 1, further comprising the step of providing a plurality of differently shaped orthodontic bracket precursors with essentially identically shaped alignment structures.

7. The method of claim 1, further comprising the steps of:
providing a die having essentially the same shape as the orthodontic bracket precursor and being formed of a polymeric material or wax;

providing a mold from embedding the die in a hardenable heat resistant material; and casting the orthodontic bracket precursor based on a lost wax casting technique.

8. The method of claim 7, wherein the alignment structure is formed by a mold portion of the mold that is located adjacent a mold gate.

9. The method of claim 8, wherein the step of casting the orthodontic bracket precursor is based on casting a molten metal.

10. The method of claim 1, further comprising the step of removing the alignment structure and thereby changing the shape of the orthodontic bracket precursor.

11. The method of claim 1, wherein the orthodontic bracket is a patient-individual lingual orthodontic bracket.

* * * * *